Dec. 19, 1933.   R. W. FLEMING   1,939,682
AIRCRAFT
Filed Oct. 31, 1931   2 Sheets-Sheet 1
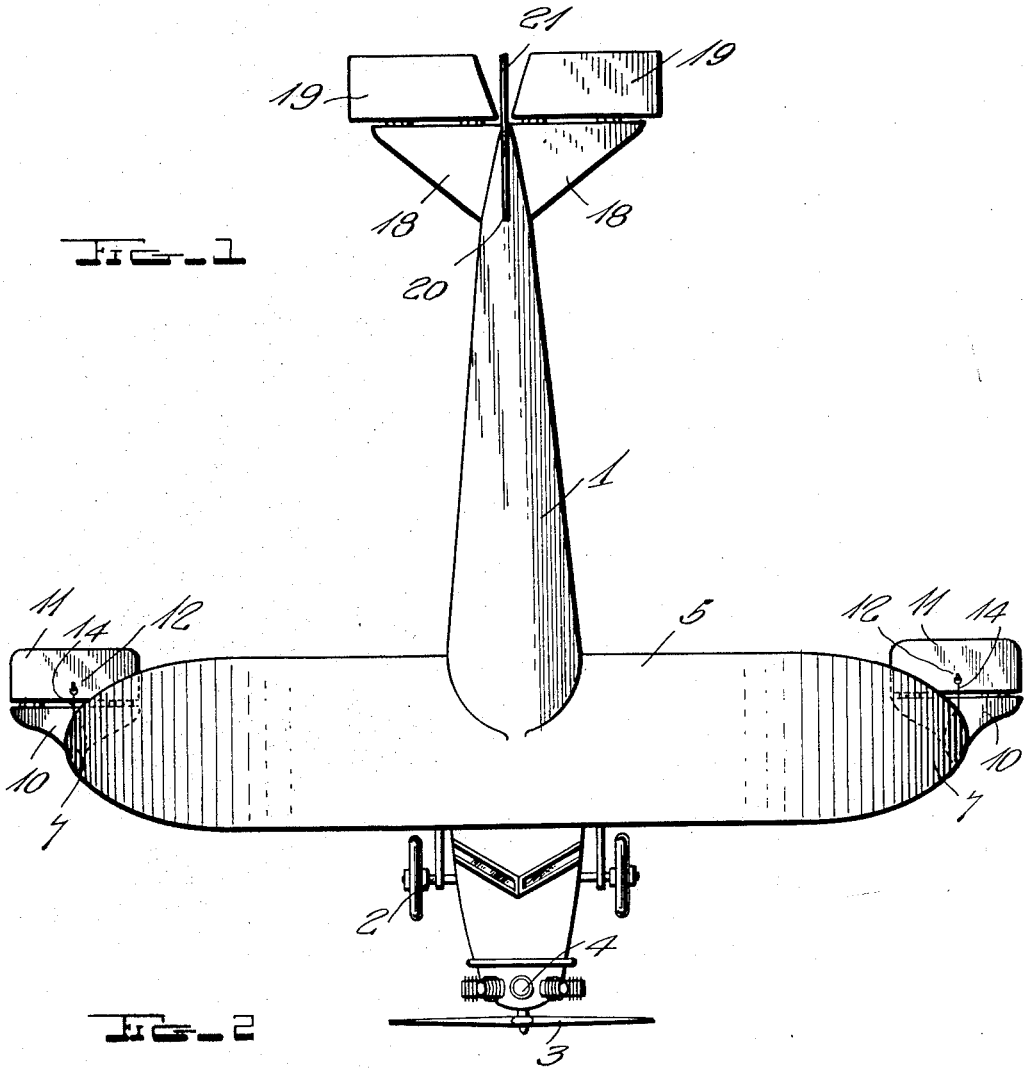
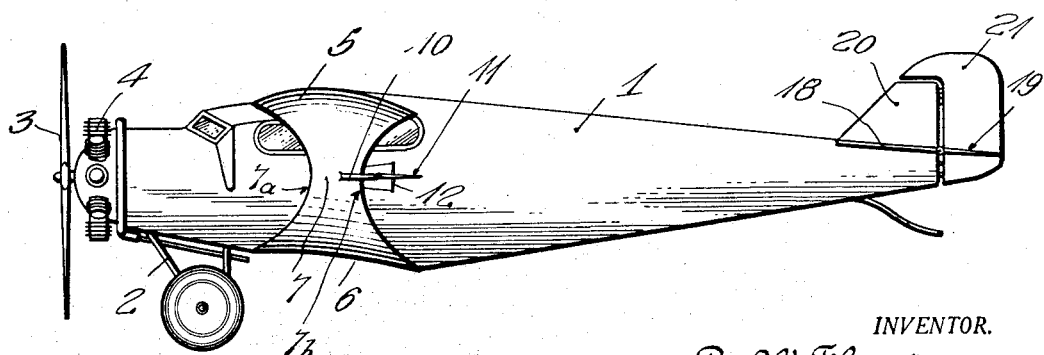
INVENTOR.
R. W. Fleming,
BY
Robert A. Lavender
ATTORNEY.

Dec. 19, 1933.    R. W. FLEMING    1,939,682
AIRCRAFT
Filed Oct. 31, 1931    2 Sheets-Sheet 2
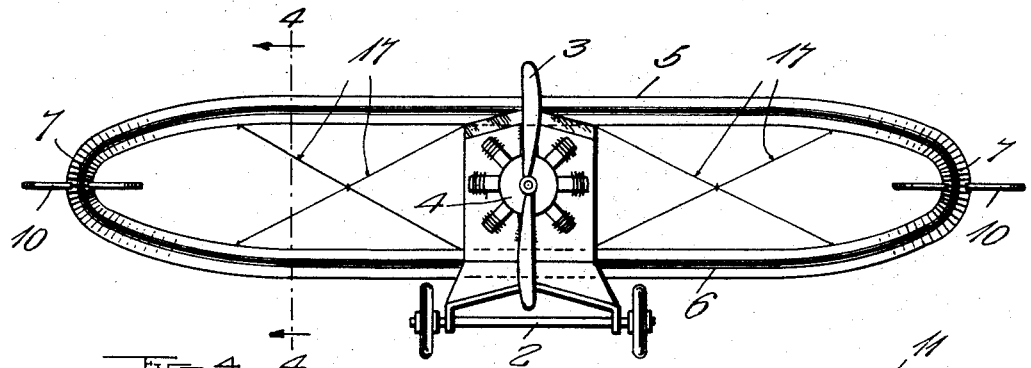
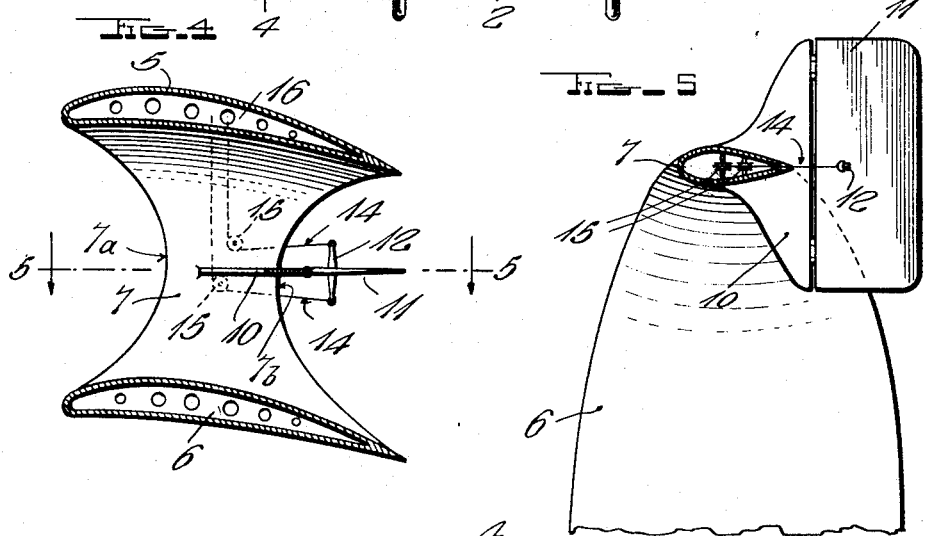
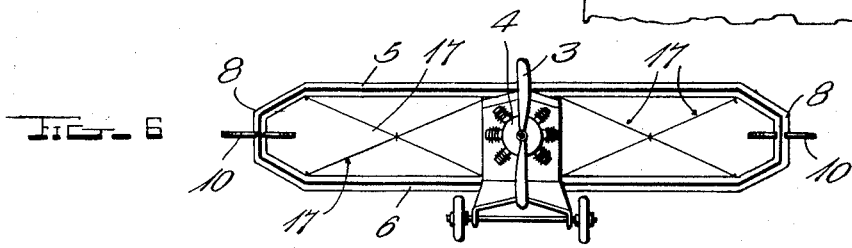
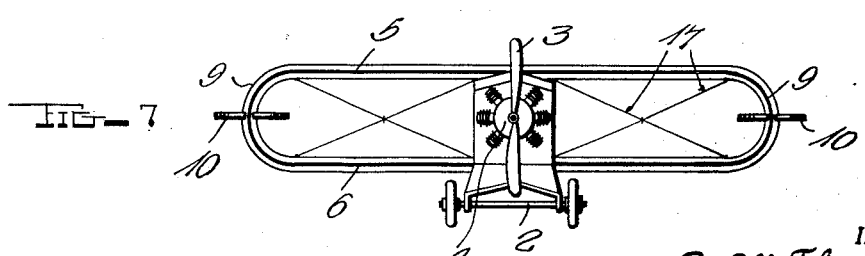
INVENTOR.
R. W. Fleming,
BY
ATTORNEY.

Patented Dec. 19, 1933

1,939,682

UNITED STATES PATENT OFFICE 1,939,682

AIRCRAFT

Robert W. Fleming, Washington, D. C.

Application October 31, 1931. Serial No. 572,415

5 Claims. (Cl. 244—29)

(Granted under the act of March 3, 1883, as amended April 30, 1928; 370 O. G. 757)

My invention relates broadly to aircraft and more particularly to an improved construction of airplane designed to increase the rigidity of airplane construction and to eliminate wing tip losses which occur at the ends of all flat winged airplanes.

One of the objects of my invention is to provide a rigid construction for the aerofoils of an airplane having means for eliminating tip losses which normally occur at the ends of the aerofoils, thereby improving the efficiency of the aircraft by reducing head resistance and induced drag at the wing tips.

Another object of my invention is to provide a rigid construction of heavier-than-air machine wherein the upper and lower planes are united to eliminate wing tips thereby avoiding wing tip losses and reducing resistance to the wind when the aircraft is in flight.

Still another object of my invention is to provide a construction of airplane in which the upper and lower wings are interconnected by an end portion which imparts rigidity to the plane construction while eliminating wing tip losses.

Still another object of my invention is to provide a construction of airplane in which the lifting portions of the airplane are formed in the shape of a closed loop having inherent rigidity without the interposition of a substantial number of wing struts.

A further object of my invention is to provide a construction of aircraft having the upper and lower planes thereof united by an extension of the upper and lower planes with supports on the extensions for mounting sets of ailerons, the controls for the ailerons extending through the extensions of the planes and through the body structure of the plane to the point of control within the aircraft.

Other and further objects of my invention reside in the symmetrical arrangement of the planes of an aircraft for obtaining a high degree of rigidity while eliminating wing tip losses by a construction according to a geometrical form as set forth more fully in the specification hereinafter following by reference to the accompanying drawings, wherein:

Figure 1 is a plan view of the improved form of aircraft embodying my invention; Fig. 2 is a side elevation of the aircraft shown in Fig. 1; Fig. 3 is a front view of the aircraft illustrated in Figs. 1 and 2; Fig. 4 is a lateral cross-sectional view taken through the upper and lower wings constituting the aerofoils looking in the direction of line 4—4 of Fig. 3; Fig. 5 is a fragmentary cross-sectional view through the extreme end of the aerofoils taken on line 5—5 of Fig. 4; Fig. 6 is a schematic view showing a modified geometrical shape for the interconnecting portion of the aerofoils in the airplane of my invention; and Fig. 7 shows a further modified form of aircraft embodying my invention.

Heretofore it has been customary to construct aircraft with one or more wings disposed in horizontal planes, interconnected and braced by struts and wires. While extended research and development has been conducted with respect to the choice of streamline forms for different parts of the aircraft for reducing resistance with the flight of the aircraft through the air, constructions causing losses inherent at the wing tips have been retained in the designs of aircraft heretofore available. The aircraft construction of my invention eliminates wing tip losses and at the same time imparts such rigidity to the planes that the number of struts for bracing the planes may be reduced and the construction of the aircraft greatly simplified. I produce a wing construction in the form of a loop or ellipse which possesses inherent rigidity and also provides passages for the control extending from the ailerons to the control points within the aircraft. I provide a structure of plane wherein the wings are interconnected by a geometrical figure similar to a polygon, a circle, an ellipse or a combination of curved or straight lines. The arrangement of the aerofoils is such that sufficient and inherent rigidity is obtained for eliminating any of the braces and wing struts heretofore required. The gradual merger of the upper wing into the lower wing or vice versa is such that abrupt wing tips are eliminated and wing tip losses correspondingly eliminated.

The flight of the plane through the air with the construction of my invention is accomplished without the individual drag upon the air at the ends of the planes. The maneuver-ability of the plane constructed in accordance with my invention is clearly increased. The ailerons may be mounted adjacent the points of merger of the upper and lower wings and are operated by control wires interconnecting end portions and through the aerofoils to the point of control. The cooperative effective of the elliptical or polygonal shaped interconnected wings for the aircraft is such that an upward or positive lift of the plane when propelled through the air is assured. A wind tunnel effect is obtained by virtue of the closed geometrical form provided by the upper and lower planes which extend on opposite sides of the fuselage.

The construction of my invention will be more fully understood by detailed reference to the drawings wherein reference character 1 designates the fuselage of the aircraft mounted upon a chassis 2 and driven by propeller 3 operated by driving engine 4. The upper wing or aerofoil is indicated at 5. The lower wing or aerofoil is shown at 6. These wings or aerofoils are arranged in a closed loop for the ends indicated at 7 merge one into the other in a streamline section shown more clearly in Fig. 5. The merger of the upper and lower aerofoils occurs along a substantially equilateral hyperbola as shown more clearly in Figs. 2 and 4. The foci of the hyperbolic curves of the uniconnecting end portion of the aerofoils are disposed intermediate the lateral extremities of the aerofoils. The edges forming the end section of the wings of the aircraft are shown on line 7a and 7b.

In Figs. 1, 2 and 3, I have shown an elliptical form for the planes of the aircraft. It will be understood however that other geometrical forms having substantially inherent rigidity may be employed as illustrated in detail in Figs. 6 and 7. In Fig. 6 for example, the upper and lower portion of the plane is the polygonal geometrical form illustrated at 8. In Fig. 7 the upper and lower planes 5 and 6 are united by circular end sections illustrated at 9. In all instances shown, the ailerons are pivotally mounted on the planes 10, extending horizontally with respect to the end sections of the plane. The ailerons 11 have strut member 12 extending downward and connected to control wires 14 to the controls of the aircraft in the fuselage. The control wires 14 pass into the end section 7 illustrated in Fig. 5 and over pulleys 15 therein extending through the upper plane 15 as represented at 16 in Fig. 4 to the controls within the fuselage 1. The planes are braced in suitable manner as shown at 17. It will be understood that many of the struts employed in aircraft construction can be eliminated thus reducing head resistance and weight. The control wires are not exposed outside of the planes but are wholly enclosed within the planes 5.

I have illustrated in Fig. 1 the arrangement of planes at the rear of the aircraft as shown at 18 and 20. The elevator planes are shown at 19 and the rudder is illustrated at 21, the elevator planes and rudder being actuated in the customary manner from the point of control within the aircraft.

It will be observed that the end sections at 7, 8 or 9 are all of streamline contour, thereby decreasing parasite drag. The normal wing tip induced drag is eliminated. Substantially greater lift and sustaining power is obtained with the construction of my invention than in the normal constructions which are subject to wing tip losses and which do not have the wind tunnel or Venturi effect for sustaining flight.

While I have described certain preferred embodiments of my invention I desire that it be understood that modifications may be made and that no limitations are intended other than are imposed by the scope of the appended claims.

The herein described invention may be manufactured and used by or for the Government of the United States for governmental purposes without the payment to me of any royalties thereon or therefor.

What I claim as new and desire to secure by Letters Patent of the United States is as follows:

1. An aircraft comprising a fuselage and a pair of lifting planes extending laterally with respect thereto, said lifting planes merging one into the other at positions remote from the opposite sides of the fuselage through a streamline section, said streamline section being formed at the leading and trailing edges on curves constituting an equilateral hyperbola.

2. An aircraft comprising a fuselage and a pair of lifting planes extending laterally with respect thereto, said lifting planes merging one into the other at positions remote from the opposite sides of the fuselage through a streamline section, said streamline section being formed at the leading and trailing edges on oppositely directed curves.

3. An aircraft comprising a fuselage and a pair of lifting planes extending laterally with respect thereto, said lifting planes merging one into the other at positions remote from the opposite sides of the fuselage through a streamline section, said streamline section being formed at the leading and trailing edges on curves constituting an equilateral hyperbola with the foci intermediate the limits of said lifting planes.

4. In an aircraft, a fuselage, a pair of wing members extending laterally from said fuselage and spaced one above the other, end streamline arc sections integrally connecting said wings at their extreme outward position, plane members secured to said arc sections and ailerons pivotally mounted to said plane members.

5. An aircraft comprising a fuselage, a pair of aerofoil members extending laterally with respect to said fuselage and spaced in different planes with relation to the direction of flight, end streamline arc sections integrally connecting said aerofoil members at their extreme outward positions, plane members secured intermediate said arc sections and extending rearward thereof, ailerons pivotally mounted to said plane members and means encased in said arc sections and aerofoils for controlling the ailerons.

ROBERT W. FLEMING.